(12) United States Patent
Bel et al.

(10) Patent No.: US 7,124,304 B2
(45) Date of Patent: Oct. 17, 2006

(54) RECEIVING DEVICE FOR SECURELY STORING A CONTENT ITEM, AND PLAYBACK DEVICE

(75) Inventors: Hendrik Jan Bel, Veldhoven (NL); Gerardus Cornelis Petrus Lokhoff, Eindhoven (NL); Michel Ronald Breugom, Eindhoven (NL); Dirk Valentinus Rene Engelen, Hasselt (BE); Peter Van De Poel, Herent (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 817 days.

(21) Appl. No.: 10/094,067

(22) Filed: Mar. 8, 2002

(65) Prior Publication Data
US 2002/0174354 A1 Nov. 21, 2002

(30) Foreign Application Priority Data
Mar. 12, 2001 (EP) .................. 01200898

(51) Int. Cl.
*H04L 9/00* (2006.01)
*G06F 11/30* (2006.01)

(52) U.S. Cl. ............... 713/193; 713/165; 380/277; 380/281

(58) Field of Classification Search ............ 713/193, 713/165; 380/277, 281; 705/59
See application file for complete search history.

(56) References Cited

U.S. PATENT DOCUMENTS

| | | | |
|---|---|---|---|
| 5,748,736 A * | 5/1998 | Mittra | 713/163 |
| 5,805,699 A * | 9/1998 | Akiyama et al. | 705/58 |
| 6,398,245 B1 * | 6/2002 | Gruse et al. | 280/228 |
| 6,550,011 B1 * | 4/2003 | Sims, III | 713/193 |
| 6,868,403 B1 * | 3/2005 | Wiser et al. | 705/51 |
| 2001/0011254 A1 * | 8/2001 | Clark | 705/59 |

FOREIGN PATENT DOCUMENTS

| | | |
|---|---|---|
| EP | 0878796 | 11/1998 |
| WO | 0052558 | 9/2000 |

* cited by examiner

*Primary Examiner*—Kim Vu
*Assistant Examiner*—Linh L D Son
(74) *Attorney, Agent, or Firm*—Larry Liberchuk

(57) ABSTRACT

A receiving device for securely storing a content item on a storage medium is disclosed. The content item is stored in a secure format, and has an associated license file. The license file is encrypted using public key associated with a group of playback devices, so that each playback device in the group can decrypt the license file and play the content item, but devices outside the group cannot. A playback device can provide a device-specific public key to a Content Distribution Management System (CDMS). The CDMS then returns the secret key for the group encrypted with the public key of the playback device. The playback device then securely obtains the secret key of the group and is subsequently able to decrypt the license file.

14 Claims, 4 Drawing Sheets

RECEIVING DEVICE FOR SECURELY STORING A CONTENT ITEM, AND PLAYBACK DEVICE

Figure 1:
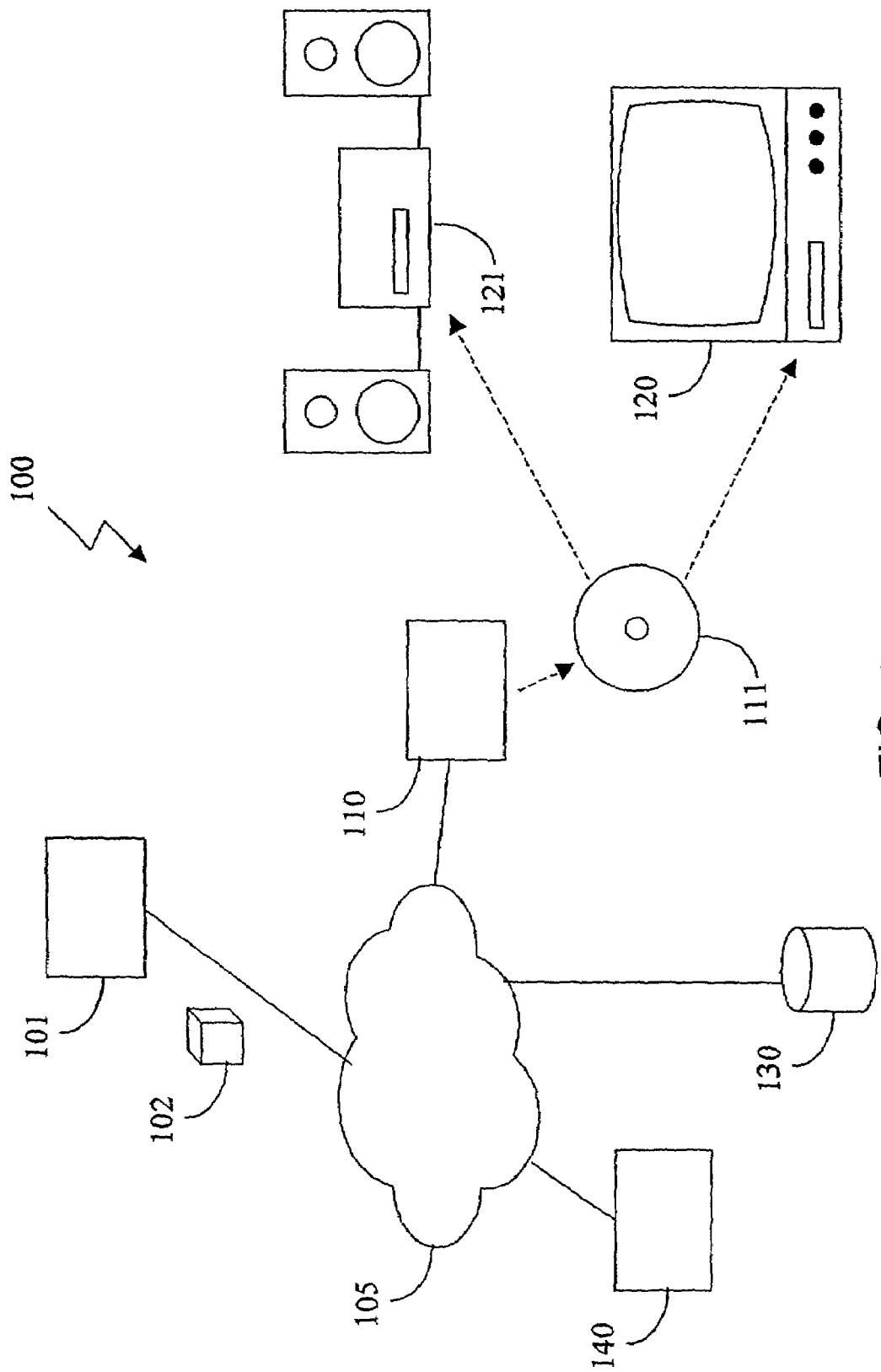

The invention relates to a receiving device for securely storing a content item, comprising downloading means for downloading the content item, writing means for writing the downloaded content item to a storage medium, and licensing means for obtaining a license file from a license server, the license file at least comprising a permission to write the downloaded content item to the storage medium.

The invention further relates to a playback device for playing a content item stored on a storage medium, comprising playback means for playing back the content item in accordance with a permission in a license file for the content item, stored on the storage medium.

File sharing services such as Napster (http://www.napster.com/) or Gnutella (http://www.gnutella.co.uk/) are widely known on the Internet. They are used by millions of users to exchange content items such as music, typically in MP3 format. Each user can offer his own music collection to everyone else, which allows everyone to have a large selection of music available for downloading. However, the music offered on these file-sharing services is typically popular music, and is offered without the permission of the copyright holders. To ensure the copyright holders get the royalties they are entitled to, some file sharing services have started to charge a subscription fee to its users. Part of the revenue from the subscription fees can then be used to pay the copyright holders.

In order to prevent users from distributing content items they downloaded in an unauthorized manner, these items are made available in a secure fashion. For instance, they can be distributed in an encrypted format, whereby software on the receiving device will permit playback but not storing in unencrypted form. One technology for securing content items is the Intertrust "Digifile" technology, known from e.g. U.S. Pat. No. 5,892,900. According to this patent, music is stored in a secure digital container, the Digifile. The receiver must obtain a license file from a license server. This license file provides a set of permissions, for example permission to play back the music, or permission to store the content item on a storage medium. The user of course has to pay a certain amount of money for each permission. The license file also contains a decryption key or other information required to access the music inside the Digifile. When the playback device has obtained a license, it can decrypt the music and play it to the user. The user can distribute the Digifile to others, but these others cannot decrypt the music without buying their own license file. Other technologies for securing content items work in a similar fashion.

The permissions can be transferred together with the Digifile to another device, so that the other device can play back the content. However, this typically requires that the other device is connected to the receiver in order to transfer Digifile and permissions. Alternatively, the license file can be coupled to the user, but this has the disadvantage that the user must authenticate himself on every device on which he wants to play back the content.

The known arrangements have the disadvantage that they do not adhere to the expectations that users are currently used to with respect to buying and listening to music. If a user buys a compact disc (CD) in a store, he pays once and then can play the CD in any device in his possession, or even in devices owned by others. He does not expect to have to pay for every time he plays back the music, or to perform cumbersome actions to transfer the music and the associated permissions to other devices. Further, pay-per-use schemes require that the playback device is connected to a network so the payment can be made and the license file can be provided. This makes it hard to use portable devices in these arrangements.

It is an object of the invention to provide a receiving device according to the preamble, which allows persistent control over the usage of the content item on the storage medium and also adheres to user expectations of the usage.

This object is achieved in accordance with the invention in a receiving device which is characterized by license locking means for encrypting the license file with an encryption key associated with a group of playback devices, and for providing the encrypted license file to the writing means for writing the encrypted license file to the storage medium. A storage medium on which content items are stored by such a receiving device can be copied in an unlimited fashion, but these content items can only be played on the playback devices in the group with which the encryption key is associated, and in accordance with the license file.

A user needs only define once the group of playback devices on which he would like to play the content item. He can do this for instance by adding every playback device to a group directly after buying it. He can then freely use the storage media written to by the receiving device. It is always possible to extend the group when the user buys new playback devices, since they can be added at any time, and the content item is stored so that any device in the group can access it, as will become apparent below.

It is known per se to encrypt data so that only a particular device can read it, for instance by encrypting the data with the public key of that particular device, preferably with the use of a session key. This means that the license file could alternatively be encrypted multiple times using multiple public keys, once for each playback device in the group. This has the disadvantage that the amount of data on the storage medium increases somewhat, but more importantly that it is then impossible to add a new device to the group and give it access to the content item. The license file has in that case been encrypted in such a fashion that only the playback devices that were already in the group at encryption time can decrypt it, so it is not possible for the receiving device to obtain the license file in order to encrypt it with the public key of the newly added device. By using a group key, no extra steps are necessary in the receiving device, and no modifications need to be made to the storage medium. The newly added playback device simply obtains the decryption key for the group and is then able to decrypt the license file.

In an embodiment the license locking means are arranged for encrypting the license file with a License Locker Encryption Key (LLEK), encrypting the LLEK with the encryption key associated with the group of playback devices, and additionally providing the encrypted LLEK to the writing means for writing the encrypted LLEK to the storage medium. A playback device that can decrypt the encrypted LLEK can then also decrypt the license file. The license file can then be used to play back the content item in accordance with the permissions therein. This provides additional flexibility.

In a further embodiment the encryption key is the public key of a public/secret key pair. The corresponding secret key is available in the playback devices in the group, so they can easily decrypt the encrypted license file. This has the additional advantage that now the encryption key does not need to be secured, so the receiving device does not have to take any measures to guard this key. If the encryption key were a secret (symmetric) key, a malicious user could steal the key from the receiving device and then decrypt the license file and play back the content item on any device.

In a further embodiment the content item comprises at least one of audio and video data. The popularity of music sharing services such as Napster has made it clear that there is a great demand for the distribution of music and other audio content. The same is to be expected for video, once network bandwidth is large enough to permit the large-scale distribution of video data. By providing receiving devices according to the invention which can facilitate secure distribution on storage media, distribution amongst groups of people becomes possible.

In a further embodiment the license locking means are further arranged for receiving a selection of an identifier of the group and for obtaining the encryption key associated with the selection from a keyserver. If the user has defined multiple groups, it is preferable that he can choose which one to use when writing the content item to the storage medium. By proving the public key for the group on the keyserver, it becomes possible for one user to securely store content items which another user can play back. So, for instance, the user can download and store a set of songs on a storage medium using the public key of a group registered to a friend. He can then give the storage medium to the friend, e.g. as a present, who can then play it on every device in his group. This allows the user to include only the content items he knows his friend will like, thereby creating a personalized present.

It is a further object of the invention to provide a playback device according to the preamble, which allows persistent control over the usage of the content item on the storage medium and also adheres to user expectations of the usage.

This object is achieved in accordance with the invention in a playback device which is characterized the license file is stored encrypted on the storage medium, and in that the playback device further comprises secure storage means for storing one or more decryption keys, each decryption key being associated with a respective group of playback devices, decoding means for checking whether a stored decryption key is suitable for decrypting the encrypted license file, and if so, decrypting the license file using the stored decryption key and providing the decrypted license file to the playback means. Since the license file is stored encrypted, only a playback device which can decrypt it can access and use the content item. If the playback device is in the correct group, as chosen by the user when the content item was written to the storage medium, the correct decryption key is provided in secure storage means.

In an embodiment the license file is stored encrypted with a License Locker Encryption Key (LLEK), said LLEK being stored on the storage medium encrypted with an LLEK encryption key, the one or more decryption keys are LLEK decryption keys, and the decoding means are arranged for checking whether a stored LLEK decryption key is suitable for decrypting the encrypted LLEK, and if so, obtaining the LLEK from the encrypted LLEK using the stored LLEK decryption key, and decrypting the license file using the LLEK. Using the LLEK as a session key provides additional flexibility.

In a further embodiment the decryption key is the secret key of a public/secret key pair. Using public key encryption makes the distribution of the encryption keys much easier, since they do not have to be kept secret. The encryption key can now simply be transmitted in the clear to the receiving device, which encrypts the license file with it. Only the playback device that has the corresponding secret decryption key can then decrypt the license file and access the license file.

In a further embodiment the playback device further comprises registration means for registering a public key of a public/secret key pair associated with the playback device at a Content Distribution Management System (CDMS), the secret key of said public/secret key pair being stored in the secure storage means, and for receiving a decryption key encrypted with said public key, decrypting said encrypted decryption key and storing the decryption key in the secure storage means. By facilitating the distribution of the secret key for the group to playback devices in this fashion, it is achieved that at no time the secret key is exposed to a malicious user, and no playback device can get access to the secret key without having registered.

The invention further relates to a computer program product for enabling a programmable device when executing said computer program product to function as the receiving device according to the invention.

The invention further relates to a computer program product for enabling a programmable device when executing said computer program product to function as the playback device according to the invention.

Figure 2:
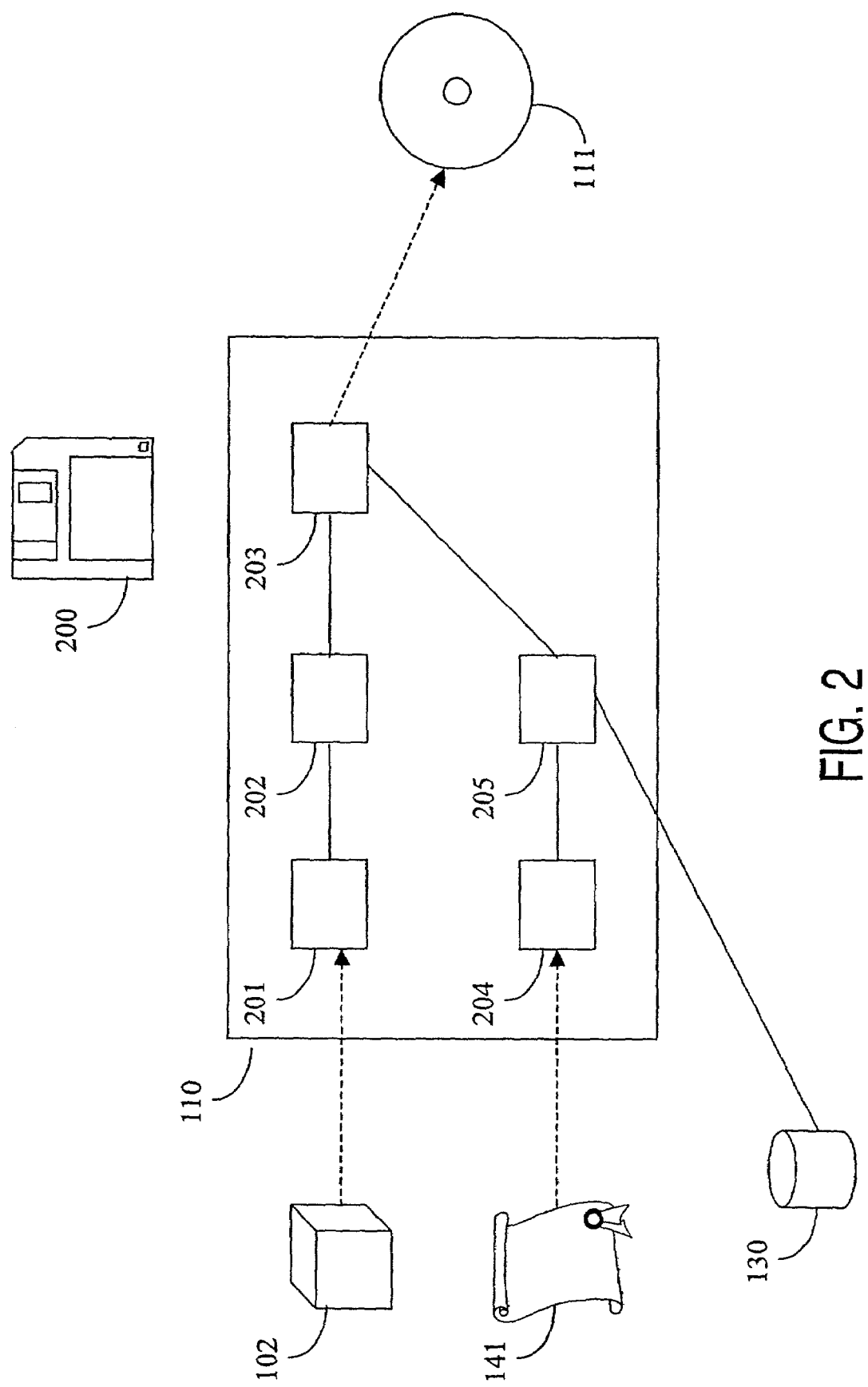
Figure 3:
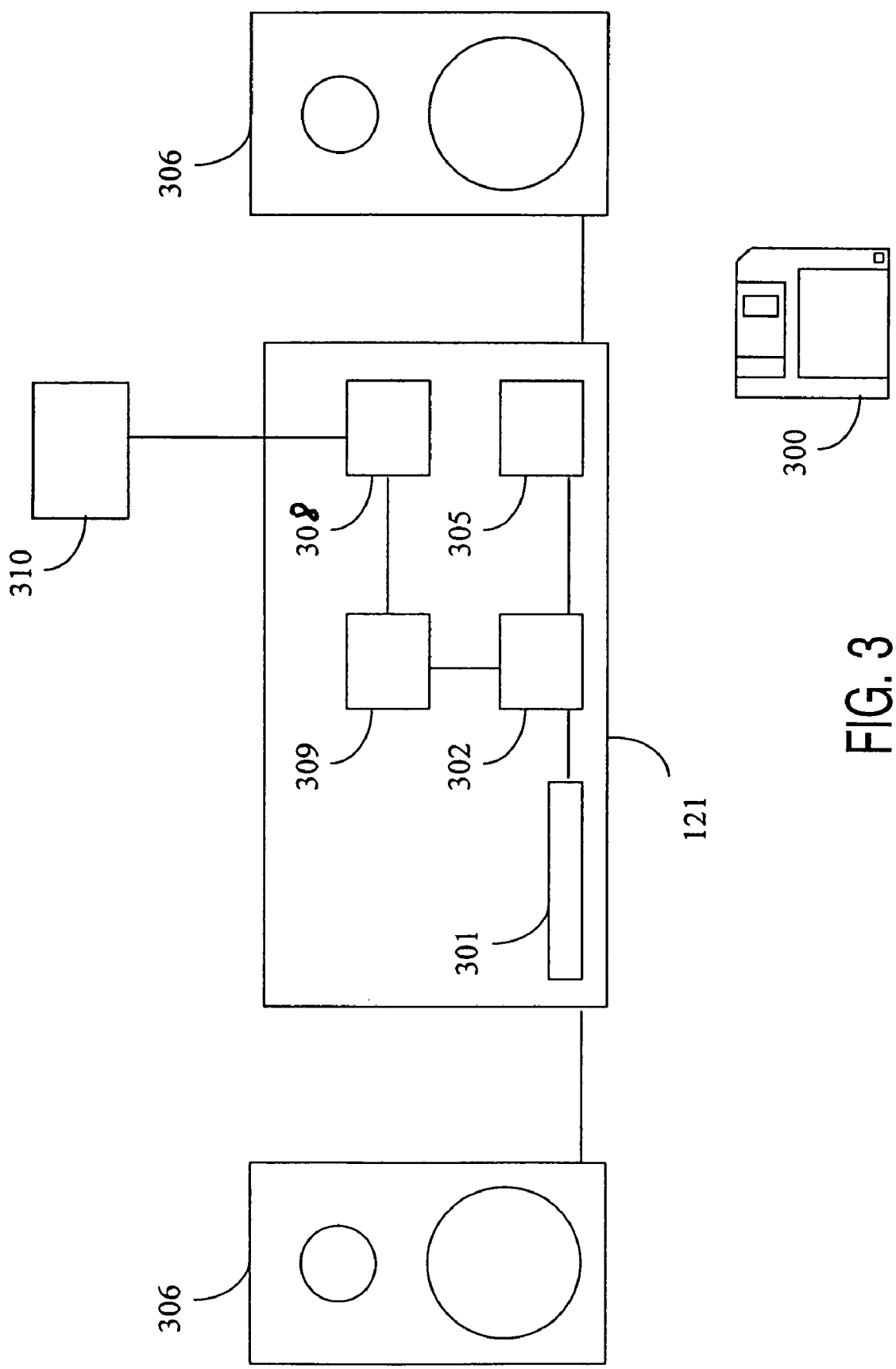
Figure 4:
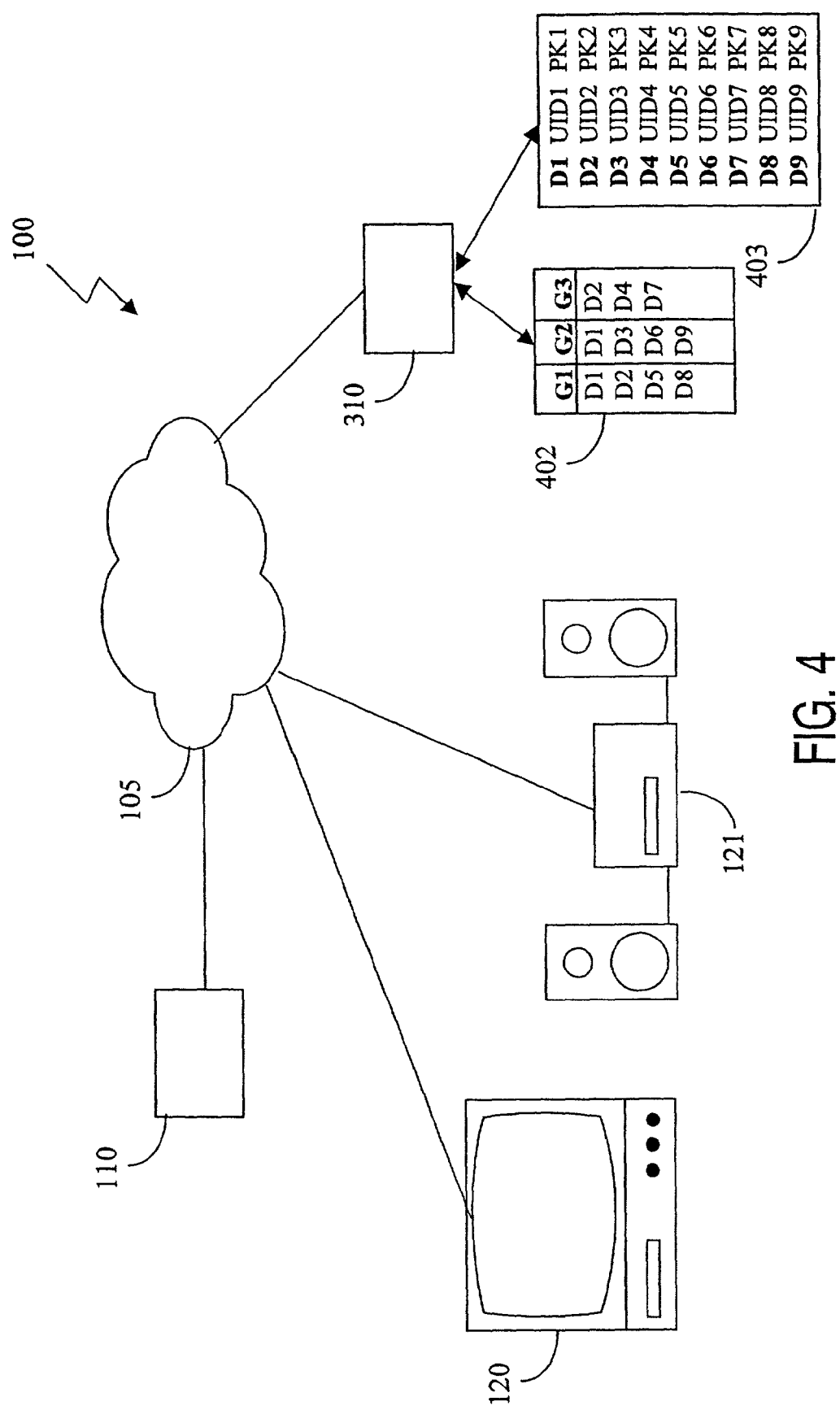

These and other aspects of the invention will be apparent from and elucidated with reference to the embodiments shown in the drawing, in which:

FIG. 1 schematically shows a first embodiment of an arrangement according to the invention;

FIG. 2 schematically shows the receiving device according to the invention in more detail;

FIG. 3 schematically shows the playback device according to the invention in more detail; and FIG. 4 schematically shows a second embodiment of the arrangement.

Throughout the figures, same reference numerals indicate similar or corresponding features. Some of the features indicated in the drawings are typically implemented in software, and as such represent software entities, such as software modules or objects.

FIG. 1 schematically shows an arrangement 100 comprising a transmitting device 101 and a receiving device 110, connected via a network 105 such as the Internet. Also connected to the network are a keyserver 130 and a license server 140, whose workings will become apparent below. The arrangement 100 enables the receiving device 110 to download content items such as content item 102 from the transmitting device 101. In a preferred embodiment the transmitting device 101 and the receiving device 110 are connected in a peer-to-peer fashion, allowing them to share files with each other. In this embodiment, a directory server (not shown) can be provided to allow the receiving device 110 to find out which files are available on the transmitting device 101 without having to contact the transmitting device 101 directly. This is particularly useful if the transmitting device 101 is one of a plurality of transmitting devices, connected to each other and to the receiving device 110 in a peer-to-peer fashion. In such a case, the receiving device 110 may additionally be arranged to operate as a transmitting device for other devices in the arrangement, in a peer-to-peer fashion. In another embodiment the transmitting device 101 is a file server from which the receiving device 110 can download content items.

The term content item refers to any kind of material which people may want to download. In particular it refers to items such as television programs, movies, music, articles or books. Content item 102 is made available on the transmitting device 101 in a secure fashion. In a preferred embodiment, the content item 102 is made available in the Intertrust "Digifile" format, known from e.g. U.S. Pat. No. 5,892,900. Other technologies for securing content items, such as the CD-2 format, can also be used. The content item 102 in the secure format may optionally be accompanied by a 'teaser', representative of the content item, in an insecure format. This allows users to view the teaser to find out if they like the content item 102 without having to buy it.

The receiving device 110 is able to download content item 102 if it is made available in such a secure format, as will become apparent below. The receiving device 110 can be for instance a set top box, a personal computer, gateway to a home network, or a consumer electronics (CE) device. With the appropriate permission, it can then play back the content item 102, possibly with the aid of a separate playback device (not shown). For instance, the receiving device 110 may be a set top box which downloads the content item 102, and transmits it to a personal entertainment system which can play it for the user.

The user can buy a license file for use with the content item 102 from a license server 140. This license file provides a set of permissions, for example a permission to play back the music, or a permission to store the content item on a storage medium. The user of course has to pay a certain amount of money for each permission. This money can be provided by having the user supply credit card information, or by identifying the user and charging the amount of money to an account for the user, or through other known ways of handling payments over a network. The license file also contains a decryption key or other information required to access the content item 102.

When the user has bought the permission to store the content item 102, the receiving device 110 can write the content item 102 to a storage medium 111, preferably a recordable compact disc, although of course other storage media such as recordable Digital Versatile Discs (DVD), hard disks or solid state memory cards will also do. The content item 102 is written to the storage medium 111 in a secure fashion, for example in the same secure format it was downloaded in. It may however be advantageous to use a different technology for secure distribution of content, for example when the devices that will read the content item 102 from the storage medium 111 cannot process the secure format in which the content item 102 was downloaded.

The user can then provide the storage medium 111, which is preferably a removable storage medium, to an appropriate playback device, such as video playback device 120 or audio playback device 121. These can then read the content item 102 from the storage medium 111 and play it to the user. To do this, they need a playback permission provided in a license file for the content item 102. How they get this permission is explained with reference to FIG. 2 below.

FIG. 2 schematically shows the receiving device 110 in more detail. The content item 102 is downloaded by download module 201, as explained above. The download module 201 can be, for instance, the downloading component of the well-known Napster file-sharing client. A transcoding module 202 processes the downloaded content item 102 by translating it into a format suitable for storing on the storage medium 111. This may involve decrypting the content item 102 and encrypting it using a different encryption technique. However, if the original secure format is acceptable, the transcoding module 202 is not necessary. A writing module 203 then writes the content item 102 to the storage medium 111.

A licensing module 204 obtains a license file 141 from the license server 140. This license file 141 must at least comprise the permission to write the content item 102 to the storage medium 111. If permission to store does not imply permission to play back the stored content item 102, then the license file 141 must also comprise permission to play back. The licensing module 204 interfaces between the license server 140 and the user, and can be implemented as a known licensing module, for instance the licensing module as provided in the Intertrust arrangement. This licensing module provides an interface to the user, with which the user can pick the licensing conditions for the content item 102, such as permission for one-time playback for a small amount of money, one-time playback for free in return for filling in a questionnaire, or playback for a month for a larger amount of money.

The licensing module 204 provides the license file 141, if it has the appropriate permission, to a license locking module 205, which produces an encrypted version of the license file 141, hereafter referred to as the License Locker. The license file 141 is preferably encrypted using a session key, hereafter called the License Locker Encryption Key (LLEK). The LLEK can be generated using known techniques for generating session keys, for example by hashing the output of a pseudo-random number generator to obtain a sequence of the required length, e.g. a 128-bits hash function such as MD5 when an 128-bits encryption algorithm is used in encrypting the license file 141.

The license locking module 205 provides the License Locker to the writing module 203, which writes it to the storage medium 111 together with the content item 102. In some storage media, for instance recordable compact discs, it is necessary to write all data to the medium at once. When such a storage medium is used, the writing module 203 may have to buffer the data to be written until all data has been obtained. For e.g. removable hard disks this is of course not required.

The LLEK is then also written to the storage medium 111, but in an encrypted form. A playback device which can read the LLEK from the storage medium 111 and decrypt it, can decrypt the license file 141 from the License Locker and is then able to play back the content item 102. By providing the content item 102 and the license file 141 in this fashion, the invention achieves that the user can play back the stored content item 102 on a playback device that does not need to be connected to the network 105.

Alternatively to using a session key, the license file 141 can also be encrypted directly with an encryption key, whose corresponding decryption key is available to the playback devices that will later have access to the storage medium 111. The encryption can be symmetric or asymmetric.

It is desirable that playback of the content item 102 is restricted to a limited number of playback devices, since this allows the copyright holder to control the use of the content item 102. However the management of the devices that can play the content should be independent from the storage of the content item 102 on the storage medium 111 itself, in order to make the arrangement 100 adhere to the user's expectations. Usually the buyer of the content is not just playing it himself, but also his family is playing it on various devices owned by the family. Friends and neighbors might also want to listen to the content item 102. Generally speaking, the playback of the content item 102 should be permitted for a certain group of people, or a group of devices owned by said group of people. In order to distinguish groups of devices, each group is assigned a Group ID. The content item 102 is linked to the Group ID, so that any device in the group can play back the content item 102 from the storage medium 111. To this end, the license file is encrypted such that any device in the group can decrypt it, but devices outside the group cannot.

In a preferred embodiment, the LLEK is encrypted with the public key of a public/secret key pair associated with the group, whereby all devices in the group have access to the corresponding secret key. Alternatively, a secret key encryption scheme can be used. The license locking module 205 prompts the user to select a Group ID, e.g. from a list displayed on a display coupled to the receiving device 110, and obtains the public key for the group e.g. by retrieving it from the keyserver 130. It then encrypts the LLEK with the public key for the group and provides the encrypted LLEK to the writing module 203 for writing on the storage medium 111. The storage medium 111 can now be provided to a playback device, such as video playback device 120 or audio playback device 121.

The receiving device 110 can be realized as a computer program product 200 being arranged for causing a processor to execute the steps described above. The computer program product 200 enables a programmable device when executing said computer program product to function as the receiving device 110. Since the receiving device 110 requires no access to any secret keys, when a public key encryption scheme is used, it becomes possible to completely realize the receiving device as computer program product 200, which can be loaded and run on a PC, for example as an addition to file sharing programs such as Napster. This provides an extension to the Napster client with which users can download and redistribute music files, yet without removing the control desired by the copyright holders.

FIG. 3 schematically shows the audio playback device 121 in more detail. Other playback devices, such as video playback device 120 can be realized in a similar fashion. The user can provide the storage medium 111 to the playback device 121, e.g. by inserting it into reception unit 301. The decoding module 302 reads the encrypted license file 141 from the storage medium 111 and decrypts it using a secret key stored in secure storage module 309. In a preferred embodiment, the decoding module 302 reads the encrypted LLEK from the storage medium 111 and uses the stored secret key to decrypt the encrypted LLEK. The decoding module 302 then uses the thusly obtained LLEK to decrypt the License Locker and obtains the license file 141.

It may happen that the decryption step requires a secret key that is not stored in the secure storage module 309. In that case, the decoding module 302 will be unable to decrypt the license file 141. Also, the playback device 121 may be included in more than one group. In that case, it will have multiple decryption keys stored in its secure storage module, one for each group it is in. So, the decoding module 302 should first check whether the correct secret key is stored in the secure storage module 309, and depending on this check decrypt the license file 141 or notify the user that obtaining the license file 141 is impossible due to a missing decryption key.

This checking can be done in various ways, for example by comparing a key identifier for the stored secret key with an identifier stored together with the encrypted license file 141. Alternatively, the license file 141 may comprise a known piece of information, such as a version number or a fixed textual string. In that case, the decoding module 302 can attempt to decrypt the license file 141 and then compare the output with the expected known piece of information. If the expected piece of information is missing in the output, then the decryption key used was incorrect. Alternatively, the secret keys may comprise an identifier for the group to which they belong, and the storage medium 111 may comprise an identifier for the group for which the license file 141 has been encrypted. The decoding module 302 can then retrieve the latter identifier and search for a secret key comprising a matching identifier in the secure storage module 309. The decoding module can also simply try to decrypt the license file 141 with each decryption key until one is found that can be used to obtain a valid license file.

The decryption step can be realized in a variety of ways, depending in part on how the secret key is stored in the secure storage module 309. This module 309 can be realized as a hardware module with embedded decryption software, so that the decoding module 302 can provide the encrypted license file 141 to the module 309, which decrypts it using the appropriate decryption key, and returns the license file 141 in plain form to the decoding module 302. This provides a large amount of security, because the actual secret key is now stored in tamperproof hardware and cannot be read out by a malicious user. Alternatively, the secure storage module 309 can simply be a read-only memory (ROM) from which the decoding module 302 can read the secret decryption key and decrypt the license file 141 itself. The module 309 can be provided on a smart card.

The decoding module 302 provides the license file 141 to the playback module 305. The playback module 305 reads the stored content item 102 from the storage medium 111 and verifies that there is a permission to playback in the license file 141. If so, it plays the content item 102 e.g. by generating audio signals on loudspeakers 306.

The secret key installed in the playback device 121, in secure storage module 309 can simply be the secret key of the group, corresponding to the public key used by the receiver 111 as outlined above with reference to FIG. 2. This requires that the secret key for the group must be distributed to every device that is added to the group, which is not very practical and certainly not secure, unless highly tamper-resistant hardware such as smart cards are used. However, this requires that the user obtains a number of such smart cards, one for each device in the group, which is cumbersome.

It is therefore preferable that every playback device has its own associated public/secret key pair, whereby the secret key is securely installed inside the playback device. This can for instance be done at the factory where the playback device is manufactured. For added security, the public/secret key pair for the device can be generated by an independent entity, such as a Certifying Authority (CA), and provided to the factory for installation by the manufacturer.

The playback device 121 has a registration module 308 which can provide the public key for registration to a Content Distribution Management System 310 (CDMS), together with a unique identifier for the playback device. This unique identifier could for instance comprise a manufacturer number, a type number and a serial number. The registration can be performed upon the request of the user, or when the playback device 121 is turned on for the first time, or at another suitable moment. Alternatively, the public key can be registered by the CA upon installation of the key pair by the manufacturer.

As will become apparent below with reference to FIG. 4, the CDMS 310 will then encrypt the secret key for the group once for each device in the group, using the registered public key of that device. The encrypted secret keys are then sent in return to the registration modules of the playback devices, which can decrypt them using their own secret keys. They then store the secret key in their secure storage modules.

From that moment on, they can decrypt any license file 141 encrypted with the public key of the group by using the corresponding secret key for the group. By facilitating the distribution of the secret key for the group in this fashion, it is achieved that at no time the secret key is exposed to a malicious user, and no playback device can get access to the secret key without having registered. This makes it possible to e.g. charge the user a higher fee when he wants permission to distribute the content item 102 to a large group of devices. Further, the number of devices in the group can be limited in accordance with the wishes of copyright holders.

The playback device 120 can be realized as a computer program product 300 being arranged for causing a processor to execute the steps described above. The computer program product 300 enables a programmable device when executing said computer program product to function as the playback device 120. Care should be taken to ensure that the secret key is not copied to another device, because this would allow the other device to impersonate the playback device 120, which breaks the possibility to charge a fee for every device on which the stored content item 111 is to be played.

FIG. 4 schematically shows another embodiment of the arrangement 100, which illustrates the process of registering groups and devices. The CDMS 310 maintains a list 402 of groups G1, G2, G3 and the devices D1, . . . , D9 in each group. A user can request the creation of a new group at the CDMS 310. The CDMS 310 then generates a public/secret key pair for the group. The public key for the group can then be provided on the keyserver 130 for downloading by the receiving device 110. By providing the public key for the group on the keyserver 130, it becomes possible for one user to securely store content items which another user can play back. So, for instance, the user can download and store a set of songs on a storage medium 111 using the public key of a group registered to a friend. He can then give the storage medium 111 to the friend, e.g. as a present, who can then play it on every device in his group. By including only the content items he knows his friend will like, and storing them using his friend's group, the user creates a personalized present.

Once the user has registered a group, he can add playback devices to it. If a device he wants to add has not yet been registered, the user must register it first so it gets added to the device list 403, for instance by activating the device's registration module 308. Upon adding a device to a group, the CDMS 310 encrypts the secret key with the public key of that device. For example, if the user adds device DE to group G1, the CDMS 310 encrypts the secret key of G1 with public key PK6. This encrypted secret key is needed by the decoding module 302 of device D6. Once the device he wants to add has been registered with the CDMS 310, he can simply select it from a device list 403 provided by the CDMS 310 and comprising device identifiers UID1, . . . , UID9 and associated public keys PK1, . . . , PK9 and add it to the group.

The user may also remove devices from the list for the group, for example to make room for new devices when the number of devices in a group is limited by the CDMS 310. This makes it possible that a user takes a device off the list for the group, yet still plays content intended for that group on that device. This is possible because that device still has the secret key for that group with which the LLEK can be decrypted, so the license file 141 can be decrypted and the content item 102 can be played. This can be prevented by e.g. periodically replacing the public/secret key pair for the group and only supplying the new secret key to devices on the list for the group at that moment. Also, charging a registration fee for every device that is added or removed from a group, reduces the user's incentive to frequently manipulate the list for his group.

To ensure that the public keys provided by the keyserver 130 are authentic, they can be certified by a Certifying Authority (CA) before being made available on the keyserver 130. The receiving device 110 can be provided with a certificate for the CA, so it can verify the authenticity of the certificates and thereby verify the authenticity of the public keys of the groups. The certificate or public key for the CA can be loaded into the receiving device 110 by the manufacturer, or be downloaded from the keyserver 130 when needed. However, loading the certificate for the CA in the receiving device 130 by the manufacturer is more secure, since it provides fewer opportunities for malicious users to replace this certificate.

An additional advantage of storing the content item 102 on the storage medium 111 in this fashion is that a playback device which is not in the appropriate group can still access the content item 102 if it obtains a new license file. The content item 102 is, after all, stored in a secure format which can be accessed with any appropriate license file. So, a user who has created a storage medium 111 with his favorite music tracks can lend the storage medium 111 to a friend whose devices are outside the user's group. The friend can then buy a one-time playback license and access the tracks on the storage medium 111 to find out what the user likes. If he likes them as well, he could ask the user to be added to his group, or download the tracks himself. The user can also create a new group, which includes devices owned by him and by his friend, and then create a new storage medium comprising the tracks they both like.

The invention claimed is:

1. A receiving device for securely storing a content item, comprising:
    downloading means for downloading the content item,
    writing means for writing the downloaded content item to a storage medium, and
    licensing means for obtaining a license file from a license server, the license file at least comprising a permission to write the downloaded content item to the storage medium, wherein
    license locking means for encrypting the license file with a license key and encrypting the license key with a group key associated with a group of playback devices, and for providing the encrypted license file and the encrypted license key to the writing means for writing the encrypted license file and the encrypted license key to the storage medium,
    the group key being encrypted by a distribution manager with a device key of a playback device of the playback devices in response to registration of the playback device with the distribution manager.

2. The receiving device as claimed in claim 1, wherein the group key is the public key of a public/secret key pair.

3. The receiving device as claimed in claim 1, wherein the content item comprises at least one of audio and video data.

4. The receiving device as claimed in claim 1, wherein the license locking means are further arranged for receiving a selection of an identifier of the group and for obtaining the group key associated with the selection from a keyserver.

5. A playback device for playing a content item stored on a storage medium, comprising:
    playback means for playing back the content item in accordance with a permission in a license file for the content item, stored on the storage medium, wherein the license file and a license key are stored encrypted on the storage medium, receiving means for receiving in response to registration of the playback device with a registration means, one or more group decryption keys, the one or more group decryption keys being encrypted by the registration means with a device key of the playback device, secure storage means for storing the one or more group decryption keys, each group decryption key being associated with a respective group of playback devices, decoding means for checking whether a stored group decryption key is suitable for decrypting the encrypted license file the license key, and if so, decrypting the license file using the license key decrypted with the stored group decryption key and providing the decrypted license file to the playback means.

6. The playback device as claimed in claim 5, wherein the license file is stored encrypted with a License Locker Encryption Key (LLEK), said LLEK being stored on the storage medium encrypted with an LLEK encryption key, the one or more decryption keys are LLEK decryption keys, and the decoding means are arranged for checking whether a stored LLEK decryption key is suitable for decrypting the encrypted LLEK, and if so, obtaining the LLEK from the encrypted LLEK using the stored LLEK decryption key, and decrypting the license file using the LLEK.

7. The playback device as claimed in claim 5, wherein the content item comprises at least one of audio and video data.

8. The playback device as claimed in claim 5, wherein the stored decryption key is the secret key of a public/secret key pair.

9. The playback device as claimed in claim 5, wherein the registration means is configured for registering a public key of a public/secret key pair associated with the playback device at a Content Distribution Management System (CDMS), the secret key of said public/secret key pair being stored in the secure storage means, and for receiving a decryption key associated with a group of playback devices encrypted with said public key, decrypting said encrypted decryption key and storing said decryption key in the secure storage means.

10. A computer readable medium storing a computer program for enabling a programmable device when executing said computer program to function as a receiving device, comprising downloading means for downloading a content item, writing means for writing the downloaded content item to a storage medium, licensing means for obtaining a license file from a license server, the license file at least comprising a permission to write the downloaded content item to the storage medium, and license locking means for encrypting the license file with license key and encrypting the license key with a group key associated with a group of playback devices, and for providing the encrypted license file and the encrypted license key to the writing means for writing the encrypted license file and the encrypted license key to the storage medium;

the group key being encrypted by a distribution manager with a device key of a playback device of the playback devices in response to registration of the playback device with the distribution manager.

11. A computer readable medium storing a computer program for enabling a programmable device when executing said computer program to function as a playback device, comprising playback means for playing back a content item in accordance with a permission in a license file for the content item, stored on the a storage medium, said playback means including:

receiving means for receiving, in response to registration of the playback device with a registration means, one or more group decryption keys, the one or more group decryption keys being encrypted by the registration means with a device key of the playback device, each group decryption key being associated with a respective group of playback devices, the license file is and a license key are stored encrypted on the storage medium, and decoding means for checking whether a stored group decryption keys key is suitable for decrypting the license key, and if so, decrypting the license file using the license key decrypted with the stored group decryption key and providing the decrypted license file to the playback means.

12. A processor device comprising:

an encryptor to encrypt a license using a license key to form an encrypted license and to encrypt the license key with a group public key associated with a group, said license being associated with a content;

a writer to write said content, said encrypted license and said encrypted license key in a memory for decryption of said encrypted license key with a secret group key associated with said group; and a reader to read said content; said secret group key being encrypted by a distribution manager with a device public key of said device in response to registering said device, said reader decrypting said encrypted secret group key using a device secret key of said device, and using said decrypted secret group key to decrypt said encrypted license key; said decrypted license key being used to decrypt said encrypted license.

13. A processor device for reading content from a memory, said playback device comprising:

decryptor to decrypt an encrypted license key stored on said memory using a first key to form a decrypted license key, and to decrypt an encrypted license stored on said memory using the decrypted license key, said license being associated with said content wherein said first key is obtained in response to registering said playback device, and wherein said registering includes providing a second key to a distribution manager, said distribution manager encrypting said first key using said second key to form an encrypted first key which is sent to said playback device for decryption to form said first key, wherein said first key is a group key associated with a group of playback devices, said group key being associated with a group of playback devices.

14. The playback device of claim 13, wherein said first key is a secret key and said second key is a public key.

* * * * *